J. A. OHLSSON.
BALL BEARING.
APPLICATION FILED OCT. 23, 1918.
1,387,609.
Patented Aug. 16, 1921.
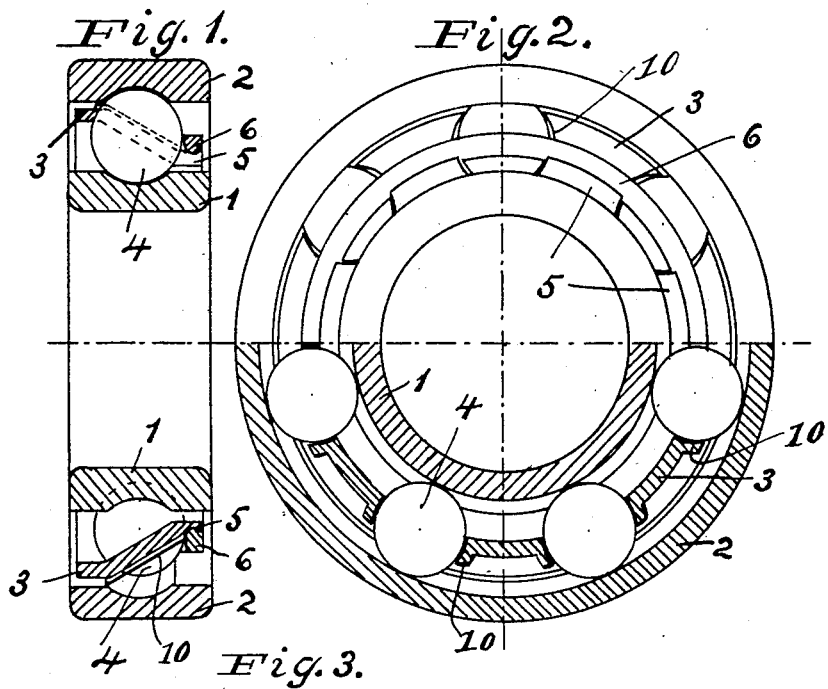
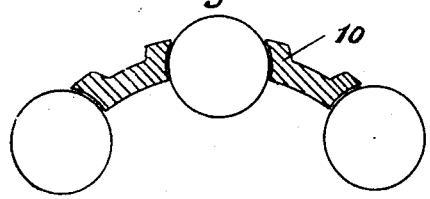
Inventor
J. A. Ohlsson.
By H. R. Kerslake
Atty.

UNITED STATES PATENT OFFICE.

JOHAN ABRAHAM OHLSSON, OF STOCKHOLM, SWEDEN, ASSIGNOR TO KLOSTERS AKTIE BOLAG, OF STOCKHOLM, SWEDEN, A CORPORATION OF SWEDEN.

BALL-BEARING.

1,387,609.  Specification of Letters Patent.  Patented Aug. 16, 1921.

Application filed October 23, 1918. Serial No. 259,329.

*To all whom it may concern:*

Be it known that I, JOHAN ABRAHAM OHLSSON, a subject of the King of Sweden, and resident of Beridarebansgatan 17, Stockholm, in the Kingdom of Sweden, have invented certain new and useful Improvements in Ball-Bearings, of which the following is a specification, reference being had therein to the accompanying drawing.

This invention relates to such ball cages for ball bearings, as consist of a ring, which is provided with recesses for the balls, extending inward from one of the rims of the ring, so that the cage may be put sidewise into the bearing and onto the balls located in the same. According to the invention the said ring is conical. Owing to this shape of the ring the cage is carried in a more reliable manner by the balls and is supported by all the balls. Besides the cage is rigid and firm even if made from sheet metal. According to the most suitable form of the invention the bearing surfaces of the ring for the balls form parts of a sphere, so that they fit snugly to the balls. For the effecting of the spherical bearing surfaces the cages, according to the invention, are manufactured in such manner, that a cylindrical cutter with a spherical end is used for producing the recesses containing the balls. The said cutter is fed into the conical ring in a direction parallel with the axis of the same.

Figure 1 of the accompanying drawing is a longitudinal section of a ball bearing having one row of balls and provided with a ball cage arranged in accordance with this invention. Fig. 2 is an end view partially a cross section of the said bearing. Fig. 3 is an enlarged fragmentary section of the ball cage and several of the bearing balls.

1 and 2 are the rings of the bearing, which may be of any suitable construction. 3 is the ball cage. The said cage consists of a conical ring, the rims of which, one or both, are bent into a position substantially parallel with the axis of the ring for rendering rigid the ring and for the reducing of the width of the ring at its outer or inner or both outer and inner sides. The ring has a suitable number of recesses for the balls extending from one of its end surfaces, so that the ring may be put onto the balls located in the bearing. The balls are then held separated and in their places by the flaps 5 confining the recesses. For the retaining of the ring on the balls a ring 6 may be put on the said flaps 5, grooves being provided in the flaps for the ring 6. The recess fits exactly to the ball, as shown in Fig. 1. Consequently, the cage bears against the balls in the most suitable manner and the friction between the parts is reduced to a minimum. Besides the cage is carried by the balls in a reliable manner and presents to the same the most effective support. Owing to the fact that the sides of the recesses converge somewhat and the tongue shaped parts located between the same are springy to some degree the ring, forced onto the balls, may be held on the same by the tongue shaped parts. Consequently, the ring 6 may be dispensed with.

As clearly shown in Figs. 2 and 3, the material of the cage is forced outward forming flanges 10, the inner surfaces of which conform to the contour of the balls.

Having now described my invention, what I claim as new and desire to secure by Letters Patent is:

1. In a ball bearing the combination with inner and outer rings and a plurality of balls of a ball cage constructed of relatively flat material and arranged in the form of a conical ring having its edge portions lying in parallelism of the axis of the ring and provided with a plurality of recesses each of which communicate with one of the edges for permitting of the insertion of balls therein, the edge portions of the ring being positioned to insure of proper action of the balls, and a retaining ring engaging the small edge portion of the conical ring for preventing displacement of the balls.

2. In a ball bearing the combination with an inner ring and an outer ring and a plurality of balls of a ball cage therein between the rings and constructed of relatively flat material pressed in the form of a conical ring having its edge portions bent to lie in parallelism with its axis and also provided with a plurality of transversely arranged recesses extending from and through the small edge portion of the ring for receiving the balls, the small bent edge portions of the ring forming flaps and provided with alining grooves and a retaining ring removably engaged in the grooves for preventing displacement of the balls.

3. An annular conical ball cage for ball bearings having recesses for bearing balls extending from one rim wherein the material at the recesses of the balls is forced upwardly forming retaining flanges so as to increase the contact area for the balls.

In witness whereof I have hereunto signed my name.

JOHAN ABRAHAM OHLSSON.